United States Patent
Beale

(10) Patent No.: US 9,302,732 B2
(45) Date of Patent: Apr. 5, 2016

(54) BICYCLE REAR SUSPENSION SYSTEM

(71) Applicant: Level One Engineering LLC, Portland, OR (US)

(72) Inventor: Luther Mac Beale, Portland, OR (US)

(73) Assignee: Level One Engineering LLC, Portland, OR (US)

(*) Notice: Subject to any disclaimer, the term of this patent is extended or adjusted under 35 U.S.C. 154(b) by 0 days.

(21) Appl. No.: 14/665,610

(22) Filed: Mar. 23, 2015

(65) Prior Publication Data

US 2015/0191213 A1    Jul. 9, 2015

Related U.S. Application Data

(63) Continuation of application No. 13/849,755, filed on Mar. 25, 2013, now Pat. No. 8,998,235.

(60) Provisional application No. 61/615,049, filed on Mar. 23, 2012.

(51) Int. Cl.
| | |
|---|---|
| *B62K 25/26* | (2006.01) |
| *B62K 19/00* | (2006.01) |
| *B62K 25/28* | (2006.01) |

(52) U.S. Cl.
CPC ............... *B62K 25/26* (2013.01); *B62K 19/00* (2013.01); *B62K 25/286* (2013.01)

(58) Field of Classification Search
CPC ...... B60D 1/363; B62K 25/286; B62K 25/04; B62K 25/28; B62K 25/30
See application file for complete search history.

(56) References Cited

U.S. PATENT DOCUMENTS

| | | | | |
|---|---|---|---|---|
| 618,627 | A * | 1/1899 | Travis | B62K 25/286 267/34 |
| 2,178,939 | A * | 11/1939 | Pease | B62K 25/04 280/283 |
| 2,283,671 | A * | 5/1942 | Finlay | B62K 25/14 280/276 |
| 5,509,679 | A | 4/1996 | Leitner | |
| 5,628,524 | A | 5/1997 | Klassen et al. | |
| 5,678,837 | A | 10/1997 | Leitner | |
| 5,899,480 | A | 5/1999 | Leitner | |
| 5,947,499 | A * | 9/1999 | Busby | B62K 19/18 267/270 |
| 6,406,048 | B1 * | 6/2002 | Castellano | B62K 25/04 280/284 |
| 6,471,230 | B2 | 10/2002 | Ellsworth et al. | |
| 6,488,301 | B2 | 12/2002 | Klassen et al. | |
| 6,783,142 | B1 * | 8/2004 | Schober | B62K 25/28 280/283 |
| 6,843,494 | B2 * | 1/2005 | Lam | B62K 25/286 280/284 |
| 7,048,292 | B2 | 5/2006 | Weagle | |
| RE39,159 | E | 7/2006 | Klassen et al. | |

(Continued)

FOREIGN PATENT DOCUMENTS

| | | |
|---|---|---|
| DE | 10 2008 008 186 A1 | 8/2009 |
| EP | 2000398 A2 | 12/2008 |

OTHER PUBLICATIONS

Sep. 28, 2012, Written Opinion of the International Searching Authority from the U.S. Receiving Office, in PCT/US2013/033670, which shares the same priority as this U.S. application.

(Continued)

*Primary Examiner* — Kevin Hurley
(74) *Attorney, Agent, or Firm* — Kolisch Hartwell, P.C.

(57) ABSTRACT

A rear suspension bicycle in which a lower linkage member between the front triangle and the rear wheel swingarm includes a flexible portion of material rather than a discrete pivot point.

12 Claims, 9 Drawing Sheets

(56) References Cited

U.S. PATENT DOCUMENTS

| | | | |
|---|---|---|---|
| 7,128,329 | B2 | 10/2006 | Weagle |
| 7,140,628 | B2 * | 11/2006 | Parkin .................... B62K 19/16 280/275 |
| 7,581,743 | B2 | 9/2009 | Graney |
| 7,661,503 | B2 | 2/2010 | Weagle |
| 7,717,212 | B2 | 5/2010 | Weagle |
| 7,784,810 | B2 | 8/2010 | Graney |
| 7,828,314 | B2 | 11/2010 | Weagle |
| 8,002,301 | B2 | 8/2011 | Weagle |
| 8,066,297 | B2 | 11/2011 | Beale et al. |
| 8,201,841 | B2 | 6/2012 | Beale et al. |
| 8,272,657 | B2 | 9/2012 | Graney et al. |
| 8,382,136 | B2 | 2/2013 | Beale et al. |
| 2003/0038450 | A1 | 2/2003 | Lam |
| 2005/0067806 | A1 | 3/2005 | Weagle |
| 2005/0067810 | A1 | 3/2005 | Weagle |
| 2006/0119070 | A1 | 6/2006 | Weagle |
| 2006/0197306 | A1 | 9/2006 | O'Connor |
| 2006/0225942 | A1 | 10/2006 | Weagle |
| 2007/0024022 | A1 | 2/2007 | Weagle |
| 2007/0108725 | A1 | 5/2007 | Graney |
| 2008/0054595 | A1 | 3/2008 | Lu |
| 2008/0067772 | A1 | 3/2008 | Weagle |
| 2008/0073868 | A1 | 3/2008 | Weagle |
| 2008/0277900 | A1 | 11/2008 | I |
| 2009/0278331 | A1 | 11/2009 | Graney |
| 2010/0059965 | A1 | 3/2010 | Earle |
| 2010/0102531 | A1 | 4/2010 | Graney et al. |
| 2010/0109282 | A1 | 5/2010 | Weagle |
| 2010/0207342 | A1 | 8/2010 | Weagle |
| 2011/0115181 | A1 | 5/2011 | Weagle |
| 2012/0061933 | A1 | 3/2012 | Weagle |
| 2013/0001918 | A1 | 1/2013 | Graney et al. |
| 2013/0001919 | A1 | 1/2013 | Graney et al. |
| 2014/0015220 | A1 * | 1/2014 | Talavasek ............ B62K 25/286 280/275 |

OTHER PUBLICATIONS

Jun. 18, 2013, International Search Report of the International Searching Authority from the U.S. Receiving Office, in PCT/US2013/033670, which shares the same priority as this U.S. application.

Sep. 14, 2014, First Action Interview Pilot Program Pre-Interview Communication from the United States Patent and Trademark Office, in U.S. Appl. No. 13/849,755, which shares the same priority as this U.S. application.

Jan. 15, 2015, Patent Cooperation Treaty International Preliminary Report on Patentability from the International Bureau, in PCT/US2013/033670, which shares the same priority as this U.S. application.

Nov. 19, 2015, Extended European Search Report from European Patent Office in European Patent Application No. 13764427.4, which shares the same priority as this U.S. patent application.

* cited by examiner

BICYCLE REAR SUSPENSION SYSTEM

CROSS-REFERENCE TO RELATED APPLICATIONS

This application is a continuation of U.S. patent application Ser. No. 13/849,755, filed Mar. 25, 2013, which claims priority to U.S. Provisional Patent Application Ser. No. 61/615,049, filed Mar. 23, 2012, which are hereby incorporated by reference.

BACKGROUND

A bicycle rear suspension system improves bicycle comfort and performance, particularly for mountain bicycles, by allowing the rear wheel of the bicycle to track the terrain to some extent. This improves rider comfort by reducing the jarring effects felt when passing over uneven terrain on a so-called "hard tail" mountain bicycle (i.e., one that lacks a rear suspension system), and improves performance by increasing traction between the bicycle and the terrain while pedaling, turning and braking.

Various bicycle rear suspension systems have previously been developed. For example, U.S. Pat. No. 5,628,524 to Klassen et al. describes a rear suspension system in which a pair of rotatable links connects the rear triangle of a bicycle to the front triangle and a shock absorber, in a manner resulting in an s-shaped travel path of the rear wheel as the shock absorber is compressed. U.S. Pat. No. 8,066,297 also describes a rear suspension system including a pair of rotatable links connecting the rear triangle to the front triangle and a shock absorber, in which one of the links changes its direction of rotation as the shock absorber is compressed, resulting in improved riding characteristics.

One goal of a rear suspension system such as those described above is to provide a relatively "stiff" ride when ascending or passing over small bumps, but to provide a relatively "forgiving" ride when descending or passing over large bumps. This reduces the unwanted loss of pedaling energy due to unnecessary shock absorption, while preserving the desirable properties of the suspension system. There remains significant room for improvement in this regard.

DETAILED DESCRIPTION

I. Definitions

The present disclosure generally relates to a bicycle rear suspension system having particularly desirable riding characteristics. These characteristics result from a particular configuration of frame portions and linkage members that will be described using various terms that have standard meanings in the field of suspension systems. These terms include:

"Instant center" means the intersection point of two lines, each of which represents the linear extension of one of the linkage members in the suspension system.

"Center of curvature" means the center of a circle that intersects the axle of the rear wheel of the bicycle and has a radius determined from the instantaneous travel path of the rear wheel.

"Shock rate" means the ratio of shock compression distance to rear wheel travel distance.

"Chainstay length" or "CSL" means the distance from the axis of the bicycle bottom bracket (i.e., the axis around which both pedals rotate) to the rear wheel axis.

"Chainstay lengthening" or "dCSL" means the rate of change of chainstay length as the shock is compressed, or alternatively as the rear wheel of the bicycle moves vertically upward.

"$d^2CSL$" means the rate of change of dCSL as the shock is compressed or as the rear wheel of the bicycle moves vertically upward.

"Braking anti-rise" is a measure of the suspension system's response to braking, and is defined as a ratio calculated as follows. First, a line is drawn between the point of contact of the rear wheel with the ground and the instant center (defined above). Then the intersection of this line with a vertical line passing through the front wheel axle is found. The height of this intersection point above the ground divided by the height of the bicycle's center of gravity is the acceleration anti-squat value. It is frequently multiplied by 100 and expressed as a percentage.

"Acceleration anti-squat" is a measure of the suspension system's response to acceleration, and is defined as a ratio calculated as follows. First, a line is drawn between the point of contact of the rear wheel with the ground and the instant center (defined above). A second line is drawn as the chain force line between the front chainring and the rear cassette gear (for a given gear ratio). A third line is then drawn through the intersection of the first line (rear wheel point of contact to instant center) and the second line (chain drive force line) and the rear wheel point of contact. Then the intersection of the third line with a vertical line passing through the front wheel axle is found. The height of this intersection point above the ground divided by the height of the bicycle's center of gravity is the acceleration anti-squat value. It is frequently multiplied by 100 and expressed as a percentage.

II. Exemplary Embodiment

Figure 1:
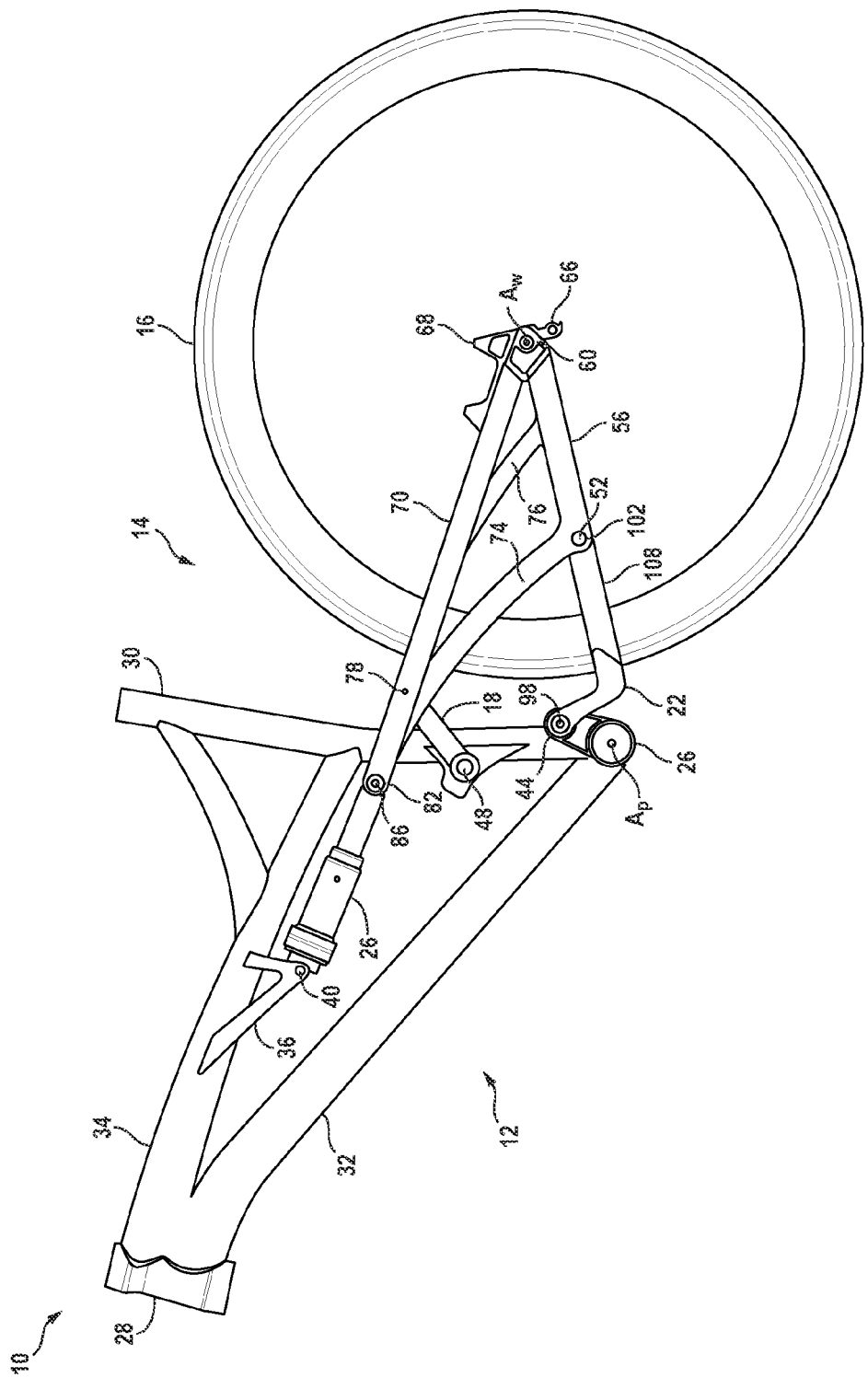
FIG. 1 is a left side elevational view depicting portions of a rear suspension bicycle, according to aspects of the present teachings.
Figure 2:
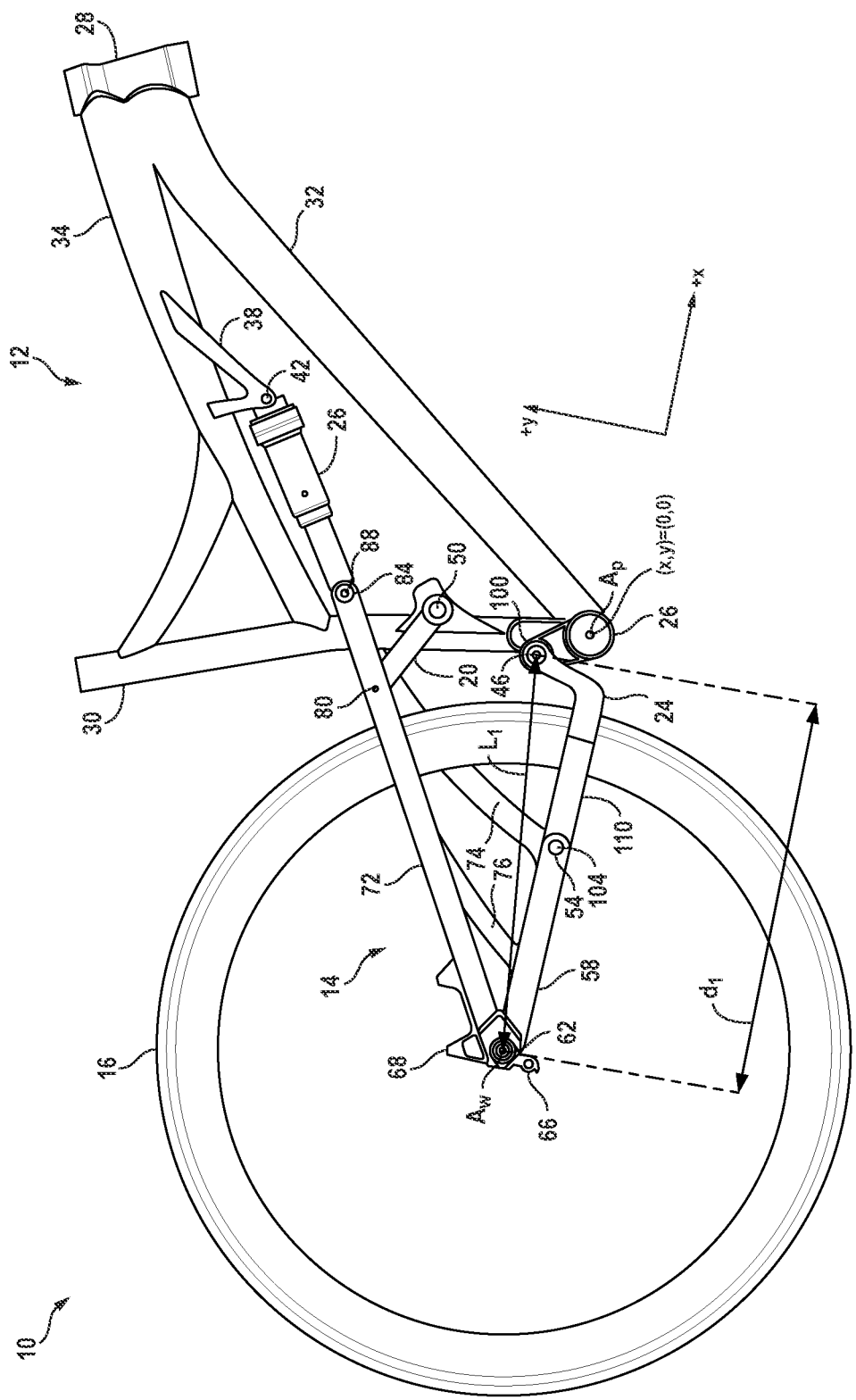
FIG. 2 is a right side elevational view depicting portions of the rear suspension bicycle of FIG. 1.
Figure 3:
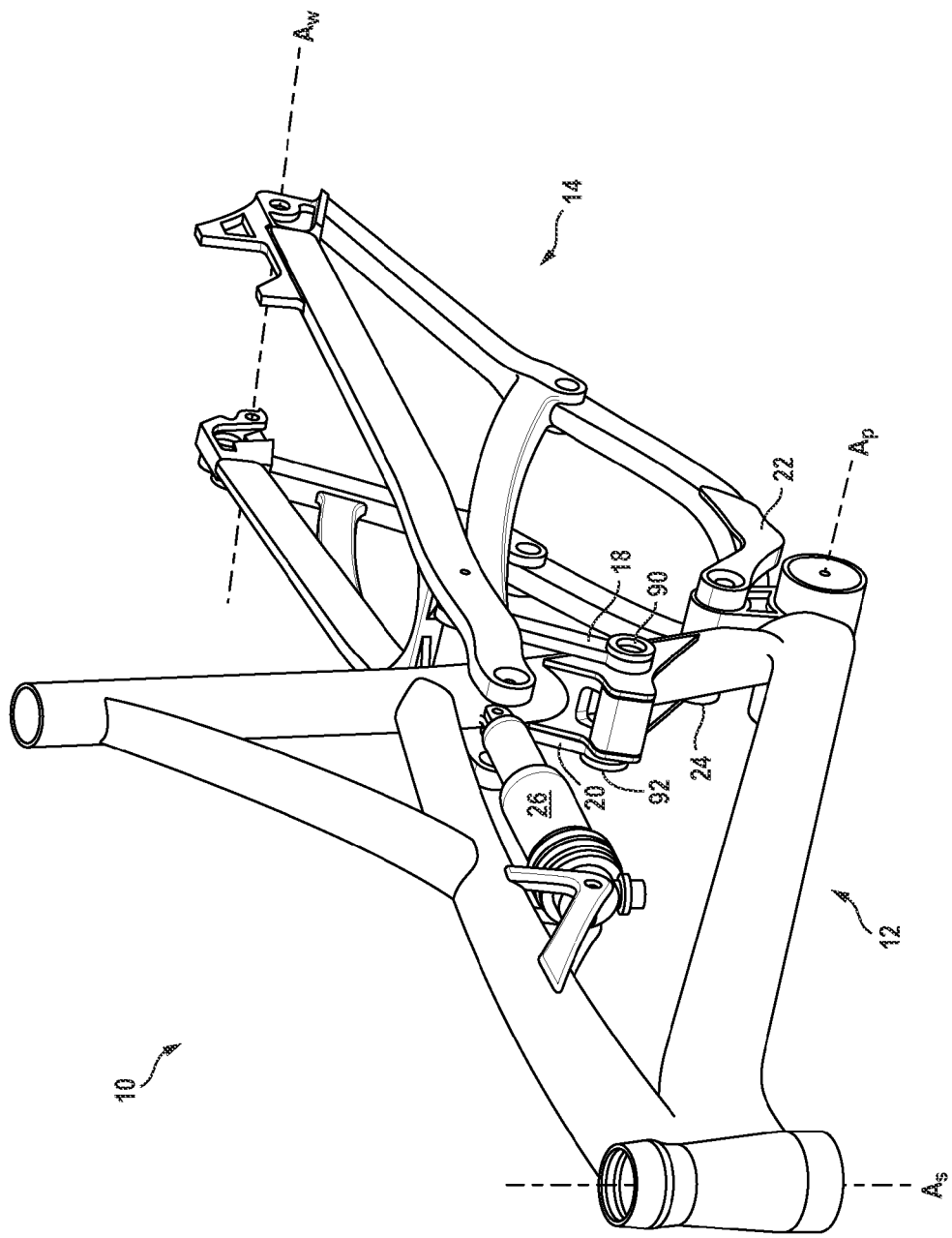
FIG. 3 is a front isometric view depicting portions of the rear suspension bicycle of FIG. 1.
Figure 4:
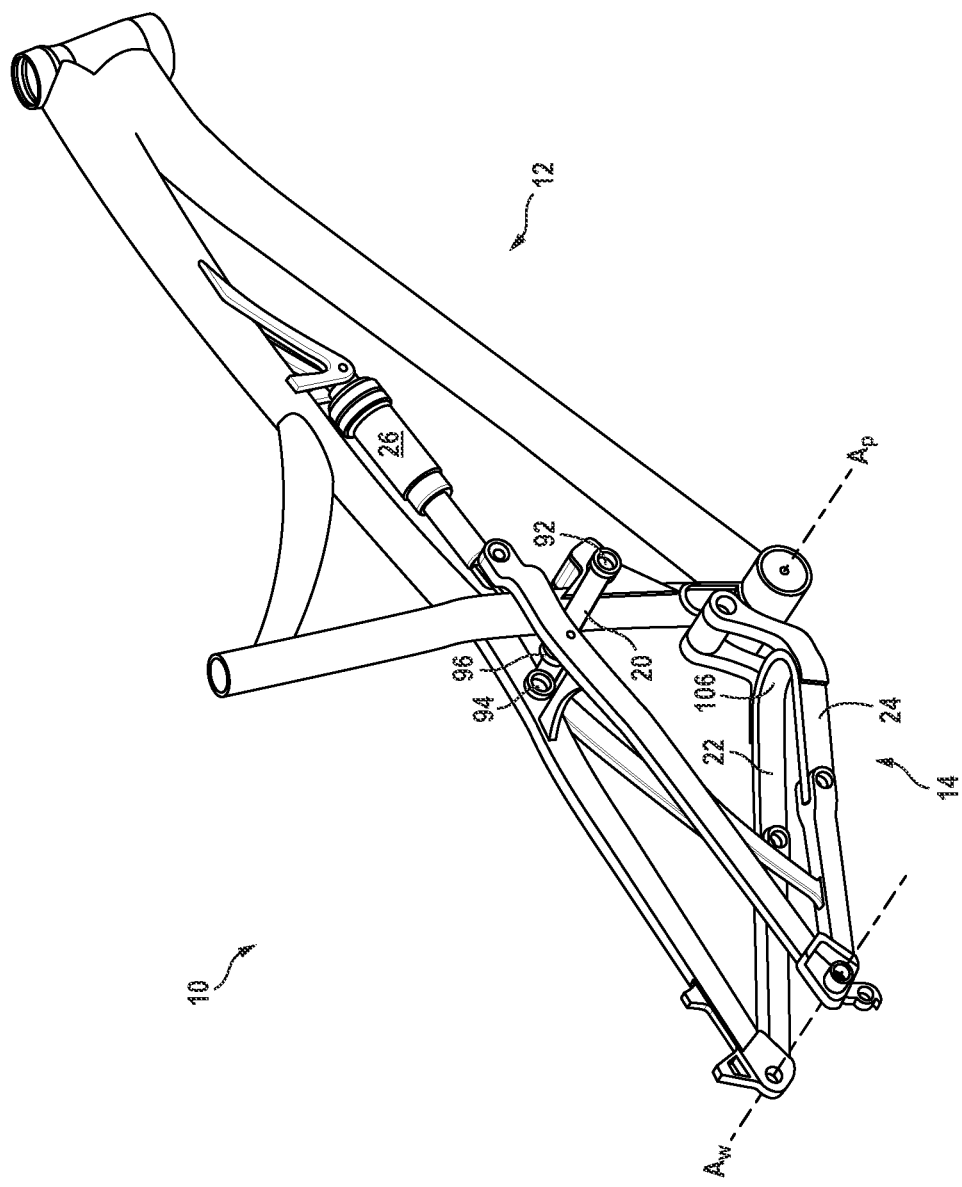
FIG. 4 is a rear isometric view depicting portions of the rear suspension bicycle of FIG. 1.

This section describes an exemplary embodiment of a bicycle, generally indicated at 10 in FIGS. 1-4, equipped with a rear suspension system according to aspects of the present teachings. FIG. 1 depicts a left side elevational view, FIG. 2 depicts a right side elevational view, FIG. 3 depicts a front isometric view, and FIG. 4 depicts a rear isometric view of portions of bicycle 10. For simplicity, FIGS. 1-2 show only the frame and rear wheel of the bicycle, and FIGS. 3-4 show only the frame of the bicycle. The remaining portions of the bicycle are unrelated to the present teachings and are not shown. The portions not shown include well known components such as a front fork, handlebars, a seat post, a seat, a crank set, and derailleurs, among others, all of which are well known in the bicycle art.

Bicycle 10 includes a front triangle generally indicated at 12, a rear triangle or rear wheel swingarm generally indicated at 14, a rear wheel 16 having an axis of rotation indicated by $A_W$, a left-hand upper linkage member 18, a right-hand upper linkage member 20, a left-hand lower linkage member 22, a right-hand lower linkage member 24, and a shock absorber 26, all of which will be described in more detail below. Generally, the upper and lower linkage members allow the front triangle to rotate relative to the rear swing arm, so that the rear wheel rotation axis $A_W$ defines a travel path having an instantaneous center of curvature as the shock absorber is compressed. According to the present teachings, rear wheel rotation axis $A_W$ will generally move along a non-arc path as the shock absorber is compressed.

Certain features of bicycle 10 are symmetric with respect to the plane defined by the bicycle. In particular, left-hand upper linkage member 18 is the mirror image of right-hand upper linkage member 20, but the upper linkage members are otherwise identical and in some cases may take the form of a single, substantially rigid upper linkage member which is symmetric about the plane of the bicycle. Similarly, left-hand lower linkage member 22 is the mirror image of right-hand lower linkage member 24, but the lower linkage members are otherwise identical and in some cases may take the form of a single, substantially rigid lower linkage member which is symmetric about the plane of the bicycle. Accordingly, any description of an upper or lower linkage member should be understood to apply equally well to its symmetric counterpart or to one side of a corresponding single, symmetric linkage member.

In the description that follows, the precise positions of various components of bicycle 10 will be provided. These coordinates apply only to the precise embodiment of FIGS. 1-4 and should be viewed as merely exemplary. All coordinates provided in the description below are measured from a pedaling axis $A_p$ of the bicycle located at (x, y)=(0, 0) in units of millimeters (mm), where the +x-direction faces toward the front of the bicycle, from the rear triangle toward the front triangle and parallel to a line connecting the axes of rotation of the wheels of the bicycle, and the +y-direction faces vertically upward, within the plane defined by the bicycle and perpendicular to the x-axis.

Front triangle 12 includes a bottom bracket shell 26 defining pedaling axis $A_p$, a head tube 28 for receiving a fork steerer (not shown) and defining a steering axis $A_s$, a seat tube 30 providing for attachment of a seat post (not shown), a down tube 32, a top tube 34, a pair of forward shock mounts 36, 38 defining forward shock mounting points 40, 42, a pair of lower pivotal attachment points 44, 46 for attachment to the lower linkage members, and a pair of upper pivotal attachment points 48, 50 for attachment to the upper links. The lengths and relative positioning of the top tube, down tube, head tube and seat tube can vary based on overall frame size, among other factors. In the coordinates defined above, lower pivotal attachment points 44, 46 of the front triangle are located at (−30.00, 49.00), and upper pivotal attachment points 48, 50 of the front triangle are located at (−2.90, 157.30). Forward shock mounting points 40, 42 are located at (176.51, 371.33).

Rear wheel swingarm 14 has a pair of lower pivotal attachment points 52, 54, a pair of chainstays 56, 58, a pair of dropouts 60, 62 allowing for the attachment of a rear wheel 64 at the rear wheel axis $A_W$, a derailleur hanger 66 for the attachment of a rear derailleur (not shown), a disc brake mount 68 allowing for the attachment of a rear wheel disc brake, a pair of seat stays 70, 72, an asymmetric pair of upright tubes 74, 76 that connect the left hand seat stay to the left hand chainstay forward of the rear wheel dropouts, a pair of upper pivotal attachment points 78, 80, and a pair of rear shock mounts 82, 84 defining rear shock mounting points 86, 88. In the previously defined coordinates, lower pivotal attachment points 52, 54 of the rear triangle are located at (−220.96, −6.13), and upper pivotal attachment points 78, 80 of the rear triangle are located at (−95.51, 205.47). Rear shock mounting points 86, 88 are located at (−5.05, 254.50), and rear wheel axis $A_W$ is located at (−438.00, 10.00).

Upper linkage members 18, 20 each include a first pivotal attachment point indicated at 90, 92 respectively, which in the embodiment of FIGS. 1-4 are each located at (−2.90, 157.30), and a second pivotal attachment point indicated at 94, 96 respectively, which in the embodiment of FIGS. 1-4 are each located at (−95.51, 205.47). Thus, one of the pivotal attachment points of each upper linkage member coincides with one of the upper pivotal attachment points of the front triangle, and the other pivotal attachment point of each upper linkage member coincides with one of the upper pivotal attachment points of the rear triangle. These coinciding pivotal attachment points may be joined together, for example with suitable bearings, collets, or the like, so that the upper linkage members will each have a first pivotal connection with the front triangle, and second pivotal connection with the rear wheel swingarm. As described previously, in some cases upper linkage members 18, 20 may form a single, substantially rigid member, with pivotal attachments points coinciding with one or more upper pivotal attachment points of the front triangle and rear swingarm.

Lower linkage members 22, 24 each include a first pivotal attachment point indicated at 98, 100 respectively, which in the embodiment of FIGS. 1-4 are each located at (−30.00, 49.00), and a second pivotal attachment point indicated at 102, 104 respectively, which in the embodiment of FIGS. 1-4 are each located at (−220.96, −6.13). Thus, one of the pivotal attachment points of each lower linkage member coincides with one of the lower pivotal attachment points of the front triangle, and the other pivotal attachment point of each lower linkage member coincides with one of the lower pivotal attachment points of the rear triangle. As in the case of the upper pivotal attachment points, these coinciding lower pivotal attachment points may be joined together in a pivotable manner so that the lower linkage members will each have a first pivotal connection with the front triangle, and second pivotal connection with the rear wheel swingarm.

As in the case of the upper linkage member(s), in some cases lower linkage members 22, 24 may form a single, substantially rigid member, with pivotal attachments points coinciding with one or more lower pivotal attachment points of the front triangle and rear swingarm. In any case, a chainstay yoke 106 joins the lower linkage members together, or in the case of a single rigid lower linkage member, forms a connection or bridge portion of the linkage member. In addition, each lower linkage member forms a chainstay segment, i.e. a frame portion normally provided by the frame chainstay tubes, as indicated at 108, 110.

Shock absorber 26 is configured to attach to forward shock mounts 36, 38 at forward shock mounting points 40, 42, and to attach to rear shock mounts 82, 84 defining rear shock mounting points 86, 88, and is therefore operatively connected to both the front triangle and the rear wheel swingarm. During operation of the bicycle, the shock absorber controls the rate and amount of compression of the suspension system due to inputs from bumps, and thus controls movement of the rear wheel swingarm relative to the front triangle. The shock absorber typically includes a spring and damper, or analogous components that function similarly. The shock absorber is typically, but not necessarily, pivotally connected to both the rear triangle and to the front triangle at shock mounting points 40, 42, 86 and 88.

Several features of bicycle 10 result from the configuration described above. These features may be understood in terms of some of the suspension system parameters defined above in the Definitions section. For example, when shock absorber 26 is in a fully compressed state, the center of curvature of the rear wheel axis of rotation $A_W$ and the instant center of the bicycle are substantially equidistant from pedaling axis $A_p$. In addition, as the shock absorber is compressed from a fully uncompressed state to a fully compressed state, a rate of change of chainstay length (i.e., dCSL) decreases substantially linearly. Furthermore, as the shock absorber is compressed from a fully uncompressed state to a fully compressed state, the acceleration anti-squat value decreases from a value substantially equal to 100% to a value of substantially equal to zero.

III. Generalizations of the Exemplary Embodiment

Still referring to FIGS. 1-4, this section describes various generalizations of the exemplary embodiment that nevertheless result in some or all of the suspension system characteristics described above and exhibited by the exemplary embodiment. To describe these generalizations, it will be helpful to consider a line drawn between either of the first pivotal connections 98, 100 of the lower linkage members 22, 24 and the rear wheel rotation axis $A_W$. This line is indicated at $L_1$ in FIG. 2. In addition, it will be helpful to consider the horizontal distance between either of the first pivotal connections 98, 100 of the lower linkage members 22, 24 and the rear wheel rotation axis $A_W$. This distance is indicated at $d_1$ in FIG. 1, and may be viewed as the horizontal (x-direction) displacement between either of pivotal connections 98, 100 and rotation axis $A_W$.

In terms of the quantities defined above, according to the present teachings one or both of the second pivotal connections 102, 104 of the lower linkage members 22, 24 may be disposed at a vertical position below line $L_1$ drawn between the first pivotal connection of the lower linkage member and rear wheel rotation axis $A_W$, and at a horizontal position between 35% and 65% of horizontal distance $d_1$ between the corresponding first pivotal connection 98, 100 of the lower linkage member and the rear wheel rotation axis. As can be seen in FIGS. 1-2, with this geometry the lower linkage members 22 and/or 24 overlap rear wheel 16 of the bicycle, as seen from a direction perpendicular to a plane formed by the rear wheel, i.e. from a direction perpendicular to the x-y plane as those coordinates have been defined.

More specifically, in some cases one or both of the second pivotal connections 102, 104 of the lower linkage members 22, 24 may be disposed at a horizontal position between 40% and 60% of horizontal distance $d_1$ between the corresponding first pivotal connection 98, 100 of the lower linkage member and the rear wheel rotation axis, or between 45% and 55% of horizontal distance $d_1$ between the corresponding first pivotal connection 98, 100 of the lower linkage member and the rear wheel rotation axis.

IV. Additional Embodiments

This section describes various additional embodiments of rear suspension bicycles according to aspects of the present teachings; see FIGS. 5-9. All of these additional embodiments may exhibit one or more of the characteristics described previously, including (i) the center of curvature of the rear wheel axis of rotation and the instant center of the bicycle may be substantially equidistant from the pedaling axis, (ii) as the shock absorber is compressed from a fully uncompressed state to a fully compressed state, a rate of change of chainstay length may decrease substantially linearly, and (iii) as the shock absorber is compressed from a fully uncompressed state to a fully compressed state, the acceleration anti-squat value may decrease from a value substantially equal to 100% to a value of substantially equal to zero.

Figure 5:
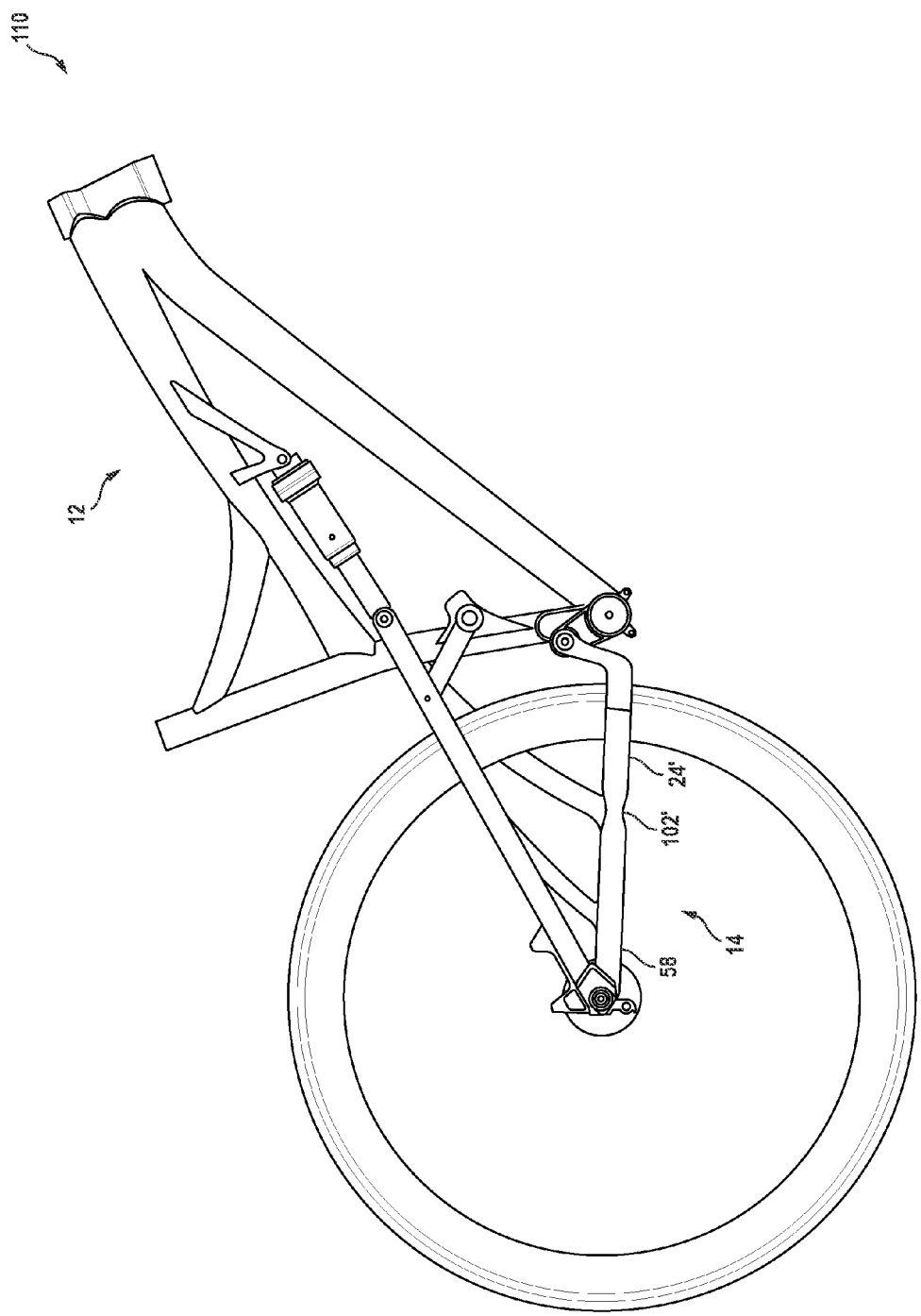
FIG. 5 is a right side elevational view depicting portions of another rear suspension bicycle, according to aspects of the present teachings.

FIG. 5 depicts a right side elevational view of portions of a bicycle, generally indicated at 110, which is similar to bicycle 10 depicted in FIGS. 1-4 except for the structure of the lower linkage members and associated elements. Accordingly, the parts of bicycle 110 that are similar to their counterparts in bicycle 10 have been given the same reference numbers as the corresponding parts of bicycle 10, and will not be described again. However, the parts of bicycle 110 that are different have been given primed reference numbers. For example, the right-hand lower linkage member of bicycle 110 is indicated at 24' in FIG. 5. The left-hand lower linkage member is not shown in the right side elevational view of FIG. 5, but would typically have the same structure as the right-hand lower linkage member 24', which will now be described.

Specifically, in some cases the lower linkage members may include second pivotal connections formed as a flexible segment of material rather than with a rotatable bearing or other similar structure, as indicated for the right-hand lower linkage member at 102' in FIG. 5. Thus, pivotal connection 102' may, for example, take the form of a section of material having a thinner cross section than the adjacent portions of chainstay 58 and lower linkage member 24', allowing the rear triangle to flex at the thinner section, which therefore may function similarly to the rotatable pivotal connection of bicycle 10 described above.

Flexible pivotal connection 102' may be constructed from the same material (e.g., carbon fiber) that forms the chainstay 58 and the remainder of lower linkage member 24', in which case the chainstay and the lower linkage member may be integrally constructed from a single continuous piece of material with varying cross section. Alternatively, pivotal connection 102' may be constructed from a material which is different from, and typically more flexible than, the material that forms chainstay 58 and/or that forms the remainder of lower linkage member 24'. In this case the material section forming pivotal connection 102' would be joined to the chainstay and/or the remainder of the lower linkage member by a suitable process such as adhesion, heat welding, or even with dedicated hardware, provided that a central region of the pivotal connection remains able to flex.

Figure 6:
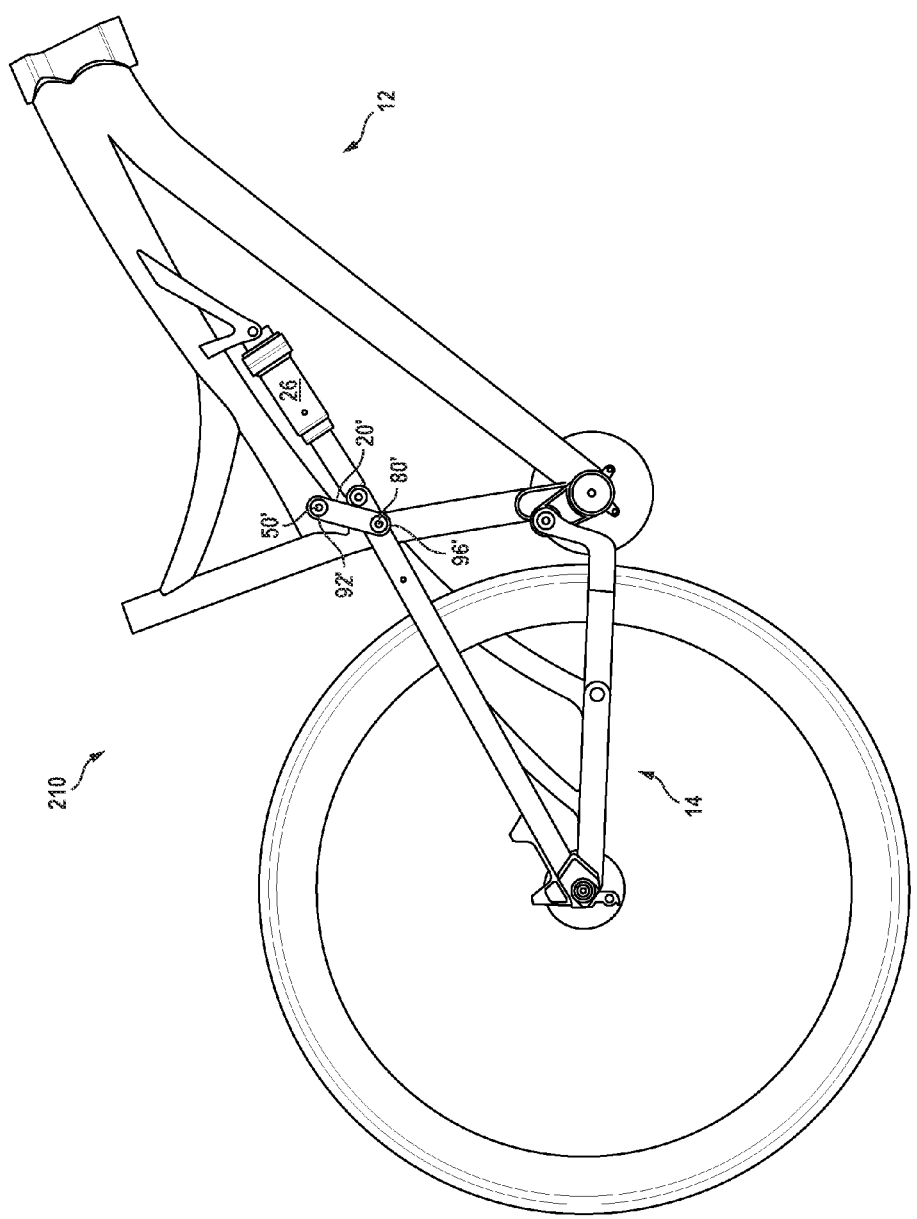
FIG. 6 is a right side elevational view depicting portions of still another rear suspension bicycle, according to aspects of the present teachings.

FIG. 6 depicts a right side elevational view of portions of another bicycle, generally indicated at 210, which is similar to bicycle 10 depicted in FIGS. 1-4 except for the structure of the upper linkage members and associated elements. Accordingly, the parts of bicycle 210 that are similar to their counterparts in bicycle 10 have been given the same reference numbers as the corresponding parts of bicycle 10, and will not be described again. However, the parts of bicycle 210 that are different have been given primed reference numbers. For example, the right-hand upper linkage member of bicycle 210 is indicated at 20' in FIG. 6. The left-hand upper linkage member is not shown in the right side elevational view of FIG. 6, but would typically have the same structure as the right-hand upper linkage member 20', which will now be described.

Specifically, right-hand upper linkage member 20' is inverted relative to upper linkage member 20 depicted in FIGS. 1-4. Thus, front triangle 12 of bicycle 210 has a pair of upper pivotal attachment points that are disposed at or adjacent to the top tube for attachment of the front triangle to the upper linkage members, as indicated at 50' in FIG. 6 for the right-hand upper pivotal attachment point. Each upper pivotal attachment point of the front triangle coincides with an upper pivotal attachment point of one of the upper linkage members, as indicated at 92' in FIG. 6, and the two coinciding pivotal attachment points may be joined together to form a pivotal connection between the upper linkage members and the front triangle.

Similarly, rear wheel swingarm 14 of bicycle 210 has a pair of upper pivotal attachment points that are disposed at or adjacent to the seat stays for attachment of the rear triangle to the upper linkage members, as indicated at 80' in FIG. 6 for the right-hand upper pivotal attachment point. Each upper pivotal attachment point of the rear wheel swingarm coincides with a lower pivotal attachment point of one of the upper linkage members, as indicated at 96' in FIG. 6, and the two coinciding pivotal attachment points may be joined together to form a pivotal connection between the upper linkage members and the rear wheel swingarm.

The configuration of bicycle 210 results in counter-rotation of the upper and lower linkage members, i.e. the upper and lower linkage members will typically rotate in opposite directions as the shock absorber is compressed or uncompressed. For example, as should be apparent from FIG. 6, as the shock absorber is compressed and the rear wheel swingarm moves generally upward, upper linkage member 20' will rotate counterclockwise with respect to the front triangle, whereas lower linkage member 24 will rotate clockwise with respect to the front triangle.

Figure 7:
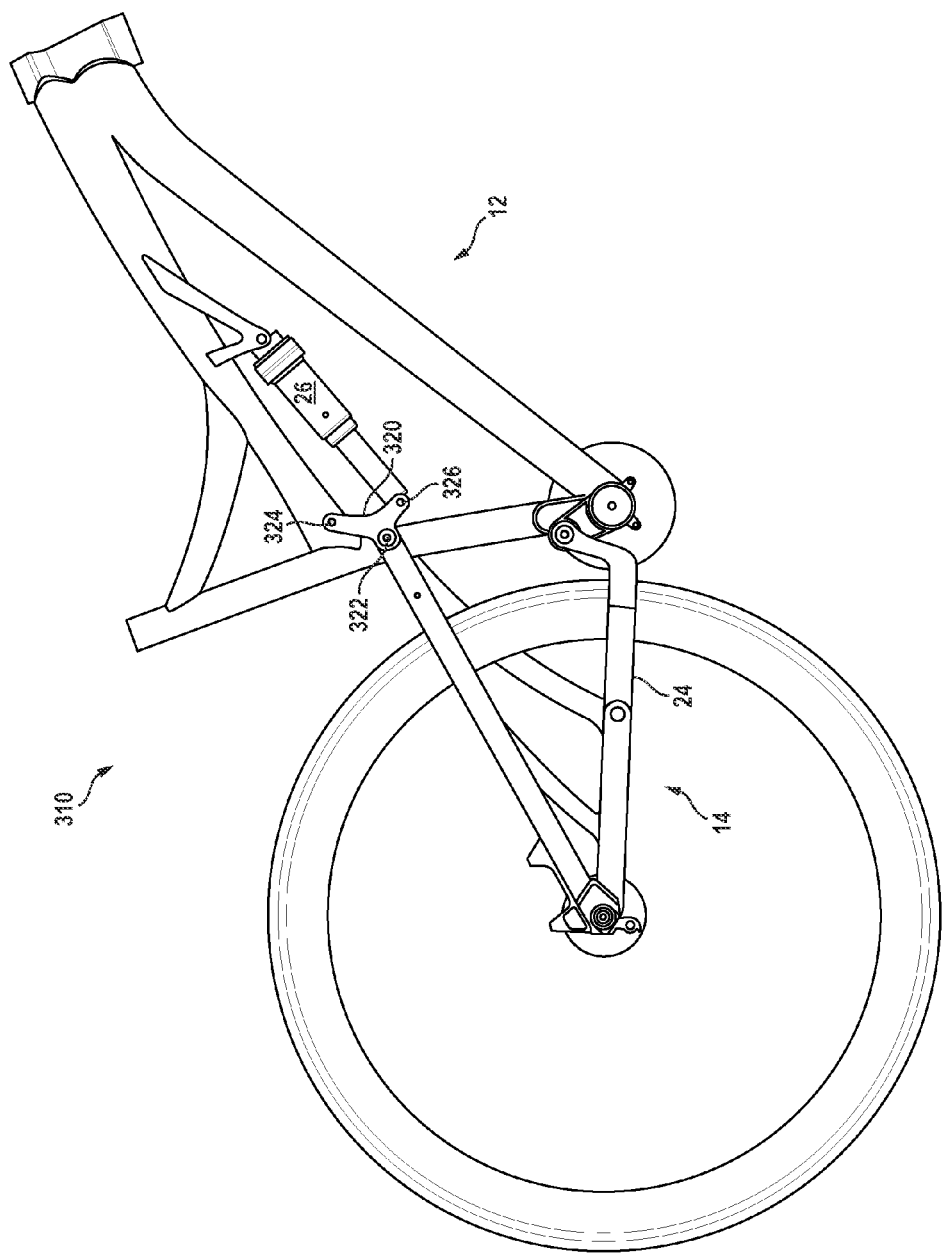
FIG. 7 is a right side elevational view depicting portions of still another rear suspension bicycle, according to aspects of the present teachings.

FIG. 7 depicts a right side elevational view of portions of yet another bicycle, generally indicated at 310, which is similar to bicycle 10 depicted in FIGS. 1-4 with certain exceptions that will be denoted by different reference numbers and described below.

Specifically, the upper linkage members of bicycle 310 have a different structure than their counterparts in bicycle 10. As indicated at 320, the right-hand upper linkage member of bicycle 310 has three pivotal attachment points 322, 324, 326. Pivotal attachment point 322 is configured to form a pivotal connection between the upper linkage member and the rear triangle; pivotal attachment point 324 is configured to form a pivotal connection between the upper linkage member and the front triangle; and pivotal attachment point 326 is configured to form a pivotal connection between the upper linkage member and the shock absorber. The left-hand upper linkage member (not shown in FIG. 7) would typically have a similar structure, and might be integrally formed with and/or rigidly connected to right-hand upper linkage member 320. In other respects, bicycle 310 is similar to bicycle 10.

As in the case of bicycle 210 depicted in FIG. 6, the configuration of the upper linkage members of bicycle 310 depicted in FIG. 7 results in counter-rotation of the upper and lower linkage members. In other words, as the shock absorber is compressed and the rear wheel swingarm moves generally upward, upper linkage member 320 will rotate counterclockwise with respect to the front triangle, whereas lower linkage member 24 will rotate clockwise with respect to the front triangle. Both directions of rotation will be reversed as the shock absorber is uncompressed.

Figure 8:
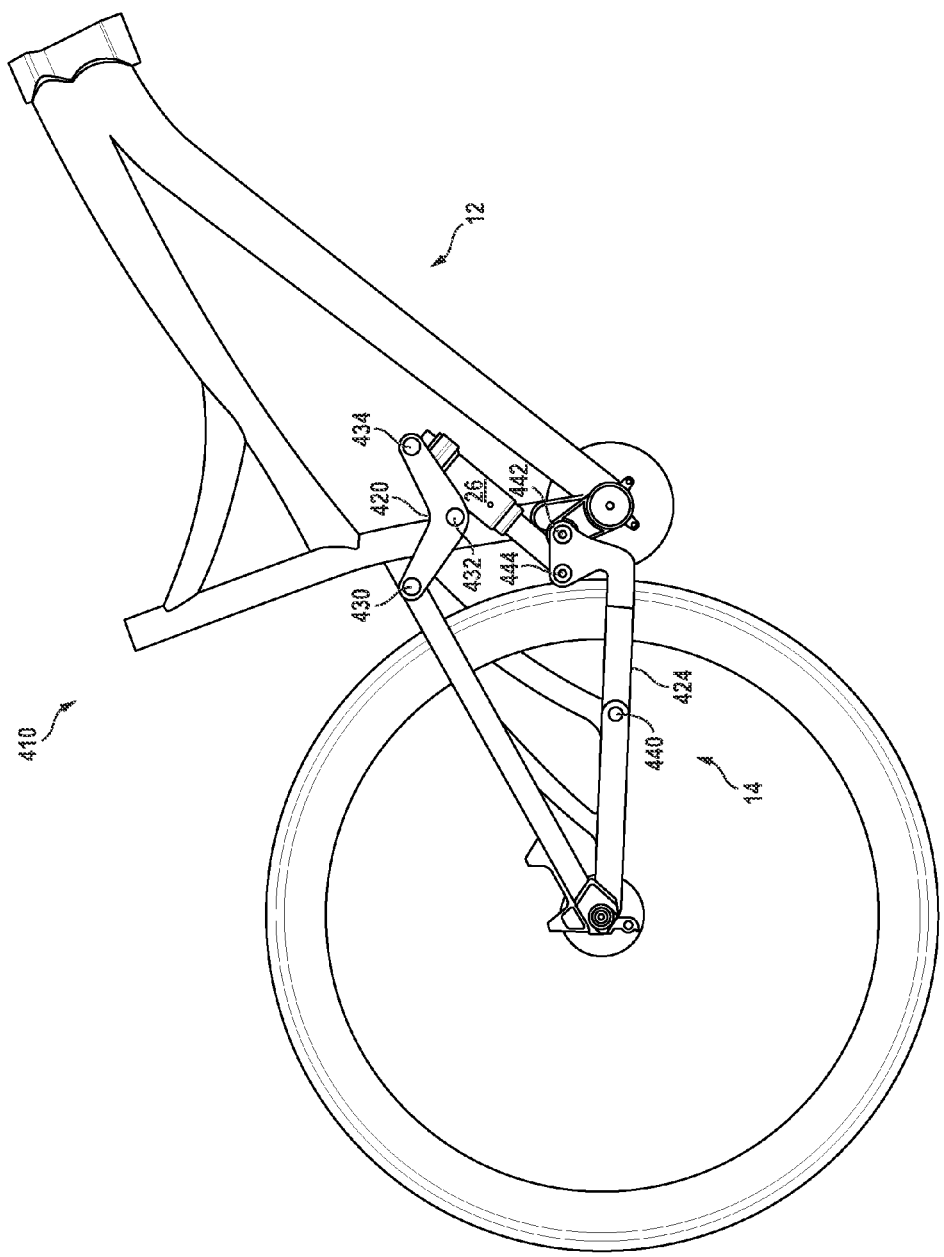
FIG. 8 is a right side elevational view depicting portions of still another rear suspension bicycle, according to aspects of the present teachings.

FIG. 8 depicts a right side elevational view of portions of still another bicycle, generally indicated at 410, which is similar to bicycle 10 depicted in FIGS. 1-4 with certain exceptions that will be denoted by different reference numbers and described below. In bicycle 410, the shock absorber 26 is attached directly to both the upper linkage members and the lower linkage members.

More specifically, both the upper and lower linkage members of bicycle 410 are configured differently than for bicycle 10, and the shock absorber is also disposed in a different position. In bicycle 410, upper linkage member 420 has three pivotal attachment points 430, 432, 434. Pivotal attachment point 430 is configured to form a pivotal connection between the upper linkage member and the rear triangle; pivotal attachment point 432 is configured to form a pivotal connection between the upper linkage member and the front triangle; and pivotal attachment point 434 is configured to form a pivotal connection between the upper linkage member and the shock absorber. The left-hand upper linkage member (not shown in FIG. 8) would typically have a similar structure, and might be integrally formed with and/or rigidly connected to right-hand upper linkage member 420.

Furthermore, lower linkage member 424 has three pivotal attachment points 440, 442, 444. Pivotal attachment point 440 is configured to form a pivotal connection between the lower linkage member and the rear triangle; pivotal attachment point 442 is configured to form a pivotal connection between the lower linkage member and the front triangle; and pivotal attachment point 444 is configured to form a pivotal connection between the lower linkage member and the shock absorber. The left-hand lower linkage member (not shown in FIG. 8) would typically have a similar structure, and might be integrally formed with and/or rigidly connected to right-hand lower linkage member 424.

Figure 9:
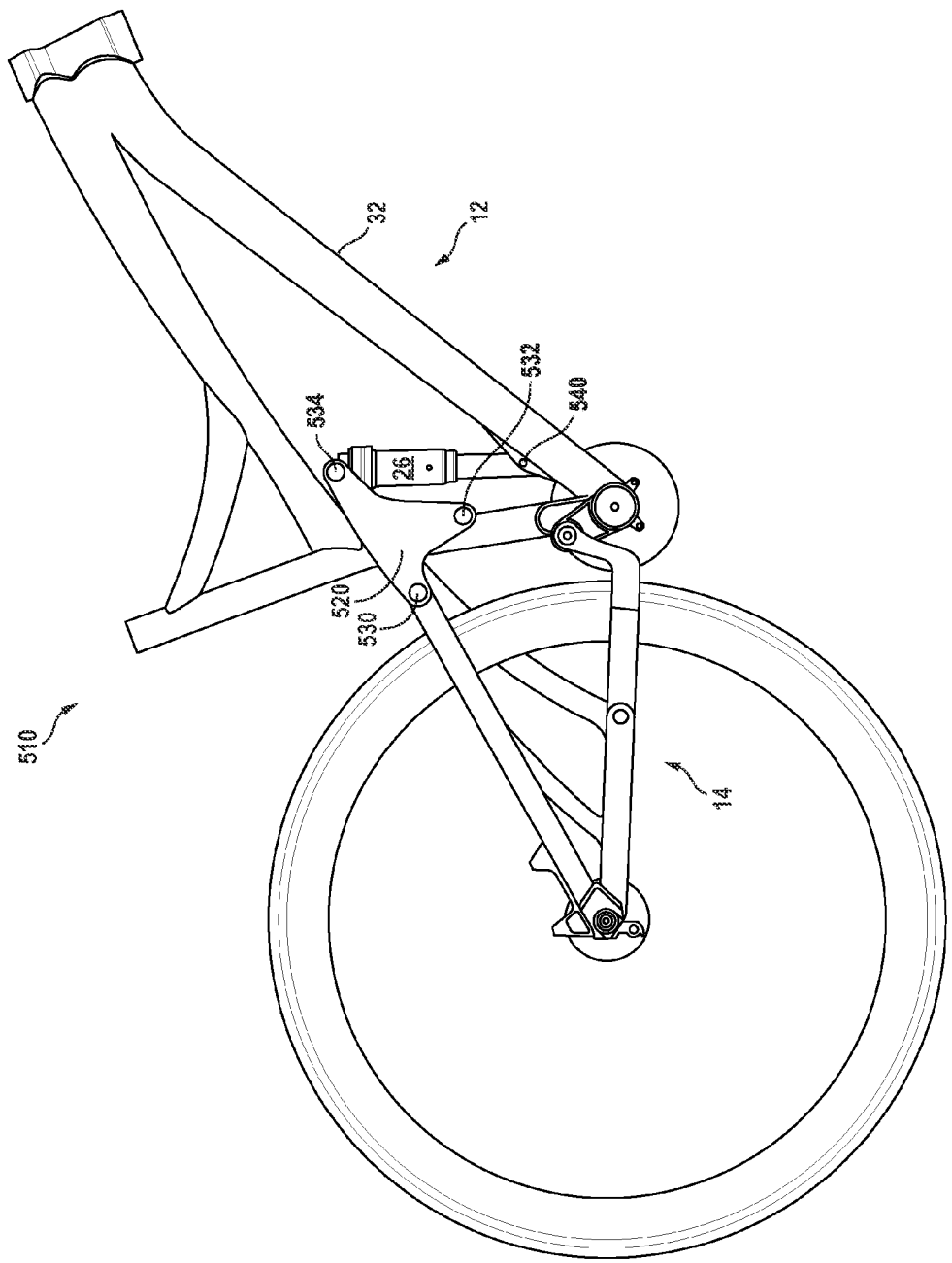
FIG. 9 is a right side elevational view depicting portions of still another rear suspension bicycle, according to aspects of the present teachings.

FIG. 9 depicts a right side elevational view of portions of yet another bicycle, generally indicated at 510, which is similar to bicycle 10 depicted in FIGS. 1-4 with certain exceptions that will be denoted by different reference numbers and described below. In bicycle 510, the shock absorber 26 is attached directly to the upper linkage members and to the down tube 32 or to a mounting bracket attached to the down tube.

More specifically, in bicycle 510, upper linkage member 520 has three pivotal attachment points 530, 532, 534. Pivotal attachment point 530 is configured to form a pivotal connection between the upper linkage member and the rear triangle; pivotal attachment point 532 is configured to form a pivotal connection between the upper linkage member and the front triangle; and pivotal attachment point 534 is configured to form a pivotal connection between the upper linkage member and the shock absorber. The left-hand upper linkage member (not shown in FIG. 9) would typically have a similar structure, and might be integrally formed with and/or rigidly connected to right-hand upper linkage member 520.

The shock absorber is also configured to attach to down tube 32, for example by forming a pivotal connection with a mounting bracket 540 attached to the down tube. In some cases, the shock absorber could instead attach directly to the down tube, for instance by forming a pivotal connection with holes formed on either side of the down tube.

V. Features of the Disclosed Embodiments

The bicycle rear suspension systems described in the present teachings have a number of features that distinguish them from previous rear suspension systems known to the present inventors. Without limitation, these include the following:

According to aspects of the present teachings, as the shock absorber is compressed, the instant center may move rearward while the center of curvature moves forward, and both may end equidistant from the pedaling axis (i.e., the center of the bottom bracket).

According to aspects of the present teachings, one pivotable connection of the lower link may be placed midway between the other pivotable connection of the lower link and the rear wheel axis of rotation. This allows for a rigid triangulated rear triangle structure, but also allows for the use of a much shorter chainstay length when compared to traditional short link designs. Designs according to the present teachings only require one pivotable connection to be placed in front of the rear wheel while the second pivotable connection may be positioned to the side of the rear wheel.

According to aspects of the present teachings, a chain tensioner/guide pulley can be mounted on a chainstay pivotable connection—there is no need for extra hardware that many other systems require for mounting a chain tensioner.

According to aspects of the present teachings, dCSL may fall monotonically at a high rate (with no local maximum), so that overall chainstay lengthening is minimized but a high initial rate can be utilized to prevent pedal induced suspension motion.

According to aspects of the present teachings, overall change in shock rate may be relatively small (<10%), rising and then falling in some embodiments (such as the embodiments shown in FIGS. 1-4 and described above), and falling and then rising in other embodiments (such as the embodiment shown in FIG. 7 and described above).

According to aspects of the present teachings, acceleration anti-squat may start very close to 100% when the shock absorber is fully uncompressed, and end very close to 0 at full travel, i.e. when the shock absorber is fully compressed. This is an ideal configuration that is very difficult to accomplish.

According to aspects of the present teachings, short chainstay length is easy to accomplish, even with alternative larger (29er, 650B) wheel sizes that are becoming more popular.

The following paragraphs more fully describe aspects of the present teachings:

A. A rear suspension bicycle, comprising:
a front triangle;
a rear wheel swingarm;
an upper linkage member having a first pivotal connection with the front triangle and a second pivotal connection with the rear wheel swingarm;
a lower linkage member having a first pivotal connection with the front triangle and a second pivotal connection with the rear wheel swingarm; and
a shock absorber operatively connected to the front triangle and the rear wheel swingarm and configured to control movement of the rear wheel swingarm relative to the front triangle;
wherein the second pivotal connection of the lower linkage member is disposed at a vertical position below a line drawn between the first pivotal connection of the lower linkage member and a rear wheel rotation axis and at a horizontal position between 35% and 65% of a horizontal distance between the first pivotal connection of the lower linkage member and the rear wheel rotation axis; and
wherein the lower linkage member overlaps a rear wheel of the bicycle, as seen from a direction perpendicular to a plane formed by the rear wheel.

A1. The rear suspension bicycle of paragraph A, wherein the second pivotal connection of the lower linkage member is disposed at a horizontal position between 40% and 60% of a horizontal distance between the first pivotal connection of the lower linkage member and the rear wheel rotation axis.

A2. The rear suspension bicycle of paragraph A, wherein the second pivotal connection of the lower linkage member is disposed at a horizontal position between 45% and 55% of a horizontal distance between the first pivotal connection of the lower linkage member and the rear wheel rotation axis.

A3. The rear suspension bicycle of paragraph A, wherein the second pivotal connection of the lower linkage member is formed by a flexible segment of material.

A4. The rear suspension bicycle of paragraph A, wherein as the shock absorber is compressed from a fully uncompressed state to a fully compressed state, a rate of change of chainstay length decreases substantially linearly.

A5. The rear suspension bicycle of paragraph A, wherein as the shock absorber is compressed from a fully uncompressed state to a fully compressed state, an acceleration anti-squat value decreases from a value substantially equal to 100% to a value of substantially equal to zero.

B. A rear suspension bicycle, comprising:
a front triangle defining a pedaling axis;
a rear wheel swingarm configured to allow attachment of a rear wheel;
an upper linkage member having a first pivotal connection with the front triangle and a second pivotal connection with the rear wheel swingarm;
a lower linkage member having a first pivotal connection with the front triangle and a second pivotal connection with the rear wheel swingarm; and
a shock absorber operatively connected to the front triangle and the rear wheel swingarm and configured to control movement of the rear wheel swingarm relative to the front triangle;
wherein as the shock absorber is compressed, a rear wheel rotation axis defines a travel path having an instantaneous center of curvature; and
wherein when the shock absorber is in a fully compressed state, the center of curvature and an instant center of the bicycle are substantially equidistant from the pedaling axis.

B1. The rear suspension bicycle of paragraph B, wherein the second pivotal connection of the lower linkage member is disposed at a vertical position below a line connecting the first pivotal connection of the lower linkage member and the rear wheel rotation axis.

B2. The rear suspension bicycle of paragraph B1, wherein the second pivotal connection of the lower linkage member is disposed at a horizontal position between 35% and 65% of a horizontal distance between the first pivotal connection of the lower linkage member and the rear wheel rotation axis.

B3. The rear suspension bicycle of paragraph B1, wherein the second pivotal connection of the lower linkage member is disposed at a horizontal position between 40% and 60% of a horizontal distance between the first pivotal connection of the lower linkage member and the rear wheel rotation axis.

B4. The rear suspension bicycle of paragraph B1, wherein the second pivotal connection of the lower linkage member is disposed at a horizontal position between 45% and 55% of a horizontal distance between the first pivotal connection of the lower linkage member and the rear wheel rotation axis.

B5. The rear suspension bicycle of paragraph B, wherein as the shock absorber is compressed from a fully uncompressed state to a fully compressed state, a rate of change of chainstay length decreases substantially linearly.

B6. The rear suspension bicycle of paragraph B, wherein as the shock absorber is compressed from a fully uncompressed state to a fully compressed state, an acceleration anti-squat value decreases from a value substantially equal to 100% to a value of substantially equal to zero.

B7. The rear suspension bicycle of paragraph B, wherein the second pivotal connection of the lower linkage member is formed by a flexible segment of material.

C. A rear suspension bicycle, comprising:
a front triangle;
a rear wheel swingarm;
a rear wheel having an axis of rotation;
an upper linkage member having a first pivotal connection with the front triangle and a second pivotal connection with the rear wheel swingarm;
a lower linkage member having a first pivotal connection with the front triangle and a second pivotal connection with the rear wheel swingarm; and
a shock absorber operatively connected to the front triangle and the rear wheel swingarm and configured to control movement of the rear wheel swingarm relative to the front triangle;
wherein the axis of rotation of the rear wheel moves along a non-arc path as the shock absorber is compressed; and
wherein the second pivotal connection of the lower linkage member is formed by a flexible segment of material disposed between the first pivotal connection of the lower linkage member and the axis of rotation of the rear wheel.

C1. The rear suspension bicycle of paragraph C, wherein the second pivotal connection of the lower linkage member is disposed at a horizontal position between 35% and 65% of a horizontal distance between the first pivotal connection of the lower linkage member and the axis of rotation of the rear wheel.

C2. The rear suspension bicycle of paragraph C, wherein the second pivotal connection of the lower linkage member is disposed at a horizontal position between 40% and 60% of a horizontal distance between the first pivotal connection of the lower linkage member and the axis of rotation of the rear wheel.

C3. The rear suspension bicycle of paragraph C, wherein the second pivotal connection of the lower linkage member is disposed at a horizontal position between 45% and 55% of a horizontal distance between the first pivotal connection of the lower linkage member and the axis of rotation of the rear wheel.

C4. The rear suspension bicycle of paragraph C, wherein the second pivotal connection of the lower linkage member is disposed at a vertical position below a line connecting the first pivotal connection of the lower linkage member and the axis of rotation of the rear wheel.

C5. The rear suspension bicycle of paragraph C, wherein when the shock absorber is in a fully compressed state, a center of curvature of a travel path of the axis of rotation of the rear wheel and an instant center of the bicycle are substantially equidistant from a pedaling axis of the bicycle.

What is claimed is:

1. A rear suspension bicycle, comprising:
a front triangle;
a rear wheel swingarm; a rear wheel having an axis of rotation;
an upper linkage member having a first pivotal connection with the front triangle and a second pivotal connection with the rear wheel swingarm;
a lower linkage member having a first pivotal connection with the front triangle and a second pivotal connection with the rear wheel swingarm; and
a shock absorber operatively connected to the front triangle and the rear wheel swingarm and configured to control movement of the rear wheel swingarm relative to the front triangle;
wherein the axis of rotation of the rear wheel moves along a non-arc path as the shock absorber is compressed;
wherein the second pivotal connection of the lower linkage member is formed by a flexible segment of material having a thinner cross section than an adjacent portion of the lower linkage member, and is disposed between the first pivotal connection of the lower linkage member and the axis of rotation of the rear wheel; and
wherein the lower linkage member and an adjoining chainstay of the bicycle are integrally constructed from a single continuous piece of material with varying cross section.

2. The rear suspension bicycle of claim 1, wherein the flexible segment of material has a thinner cross section than the adjoining chainstay of the bicycle.

3. The rear suspension bicycle of claim 1, wherein when the shock absorber is in a fully compressed state, a center of curvature of a travel path of the axis of rotation of the rear wheel and an instant center of the bicycle are equidistant from a pedaling axis of the bicycle.

4. The rear suspension bicycle of claim 1, wherein the second pivotal connection of the lower linkage member is disposed at a horizontal position between 35% and 65% of a horizontal distance between the first pivotal connection of the lower linkage member and the axis of rotation of the rear wheel.

5. The rear suspension bicycle of claim 1, wherein the second pivotal connection of the lower linkage member is disposed at a horizontal position between 45% and 55% of a horizontal distance between the first pivotal connection of the lower linkage member and the axis of rotation of the rear wheel.

6. The rear suspension bicycle of claim 1, wherein the second pivotal connection of the lower linkage member is disposed at a vertical position below a line connecting the first pivotal connection of the lower linkage member and the axis of rotation of the rear wheel.

7. A rear suspension bicycle, comprising:
a front triangle;
a rear wheel swingarm;
a rear wheel having an axis of rotation;
an upper linkage member having a first pivotal connection with the front triangle and a second pivotal connection with the rear wheel swingarm;
a lower linkage member having a first pivotal connection with the front triangle and a second pivotal connection with the rear wheel swingarm; and
a shock absorber operatively connected to the front triangle and the rear wheel swingarm and configured to control movement of the rear wheel swingarm relative to the front triangle;
wherein the axis of rotation of the rear wheel moves along a non-arc path as the shock absorber is compressed; and
wherein the second pivotal connection of the lower linkage member is formed by a flexible segment of material disposed between the first pivotal connection of the lower linkage member and the axis of rotation of the rear wheel; and
wherein the lower linkage member and an adjoining chainstay of the bicycle are integrally constructed from a single continuous piece of material with varying cross section.

8. The rear suspension bicycle of claim 7, wherein the second pivotal connection of the lower linkage member is disposed at a horizontal position between 35% and 65% of a horizontal distance between the first pivotal connection of the lower linkage member and the axis of rotation of the rear wheel.

9. The rear suspension bicycle of claim 7, wherein the second pivotal connection of the lower linkage member is disposed at a horizontal position between 40% and 60% of a horizontal distance between the first pivotal connection of the lower linkage member and the axis of rotation of the rear wheel.

10. The rear suspension bicycle of claim 7, wherein the second pivotal connection of the lower linkage member is disposed at a horizontal position between 45% and 55% of a horizontal distance between the first pivotal connection of the lower linkage member and the axis of rotation of the rear wheel.

11. The rear suspension bicycle of claim 7, wherein the second pivotal connection of the lower linkage member is disposed at a vertical position below a line connecting the first pivotal connection of the lower linkage member and the axis of rotation of the rear wheel.

12. The rear suspension bicycle of claim 7, wherein when the shock absorber is in a fully compressed state, a center of curvature of a travel path of the axis of rotation of the rear wheel and an instant center of the bicycle are equidistant from a pedaling axis of the bicycle.

\* \* \* \* \*

UNITED STATES PATENT AND TRADEMARK OFFICE
CERTIFICATE OF CORRECTION

PATENT NO.        : 9,302,732 B2                           Page 1 of 1
APPLICATION NO.   : 14/665610
DATED             : April 5, 2016
INVENTOR(S)       : Luther Mac Beale It is certified that error appears in the above-identified patent and that said Letters Patent is hereby corrected as shown below:

Claims

Column 12, line 10 in Claim 1 after "wherein the lower linkage member and an adjoining":, delete "chainstav":, insert --chainstay--

Column 12, line 62 in Claim 7 after "wherein the lower linkage member and an adjoining":, delete "chainstav":, insert --chainstay--

Signed and Sealed this
Thirty-first Day of May, 2016

Michelle K. Lee
*Director of the United States Patent and Trademark Office*